April 6, 1943.   M. P. HUBBELL   2,315,524
POSITIVE DRIVE CHUCK
Filed April 21, 1942
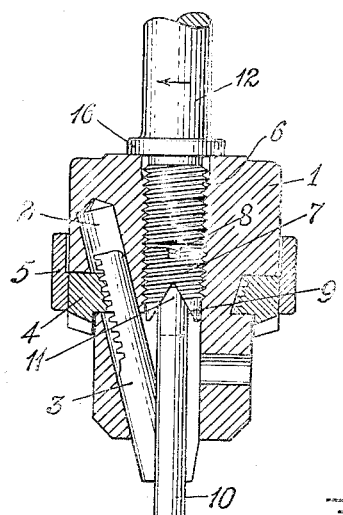
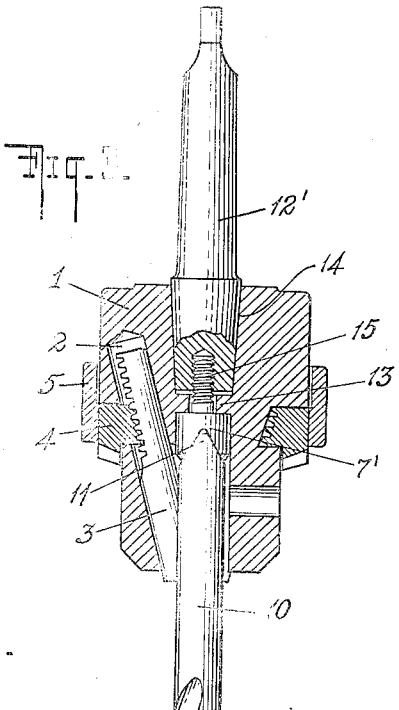
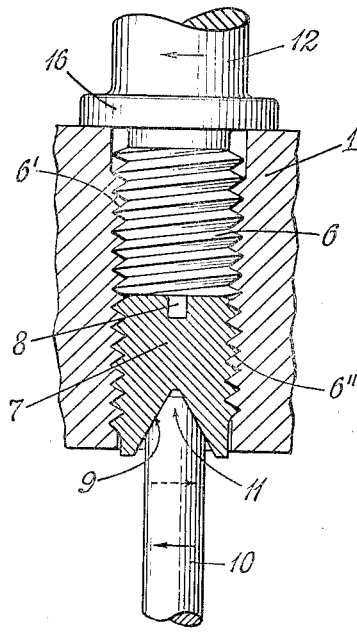
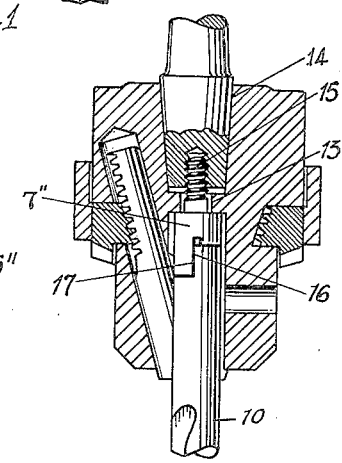
WITNESS
G. V. Rasmussen
INVENTOR
MINOTT P. HUBBELL
BY
Briesen & Schrenk,
ATTORNEYS Patented Apr. 6, 1943

2,315,524

UNITED STATES PATENT OFFICE 2,315,524

POSITIVE DRIVE CHUCK

Minott P. Hubbell, Ashburnham, Mass., assignor to T. R. Almond Manufacturing Co., Ashburnham, Mass., a corporation of New York Application April 21, 1942, Serial No. 439,843

6 Claims. (Cl. 279—62)

This invention relates to chucks of the positive drive type and has for its object the provision of means which will serve the double purpose of providing such positive drive as well as locking the connection between the chuck and its arbor and which will be at the same time capable of functioning in connection with tools of varying sizes.

It has heretofore been common practice to provide the end of the shanks of tools such as drills, reamers, keyway cutters, end mills, etc., with a flat tang adapted to cooperate with parts of the chuck whereby the force of rotation is transmitted directly from the arbor to the chunk and from chuck to the drill shank. One difficulty of this type of construction is that the tangs of different sized tools vary in dimensions and that chucks adapted for one size of tool are not appropriate for other sizes. It has also been a difficulty that with modern high speed operations the chuck is likely to become loosened on its arbor. It is the object of the present invention to overcome such difficulties and to provide a positive drive chuck in which the element through which the positive drive is made effective with relation to the tool shall provide an automatically functioning lock to assure that loosing as between the chuck and its arbor shall not take place. The element which performs this locking and positive drive effect is also shaped so as to accommodate tools of any size within the range of the chuck.

The invention is illustrated in the accompanying drawing in which Fig. 1 is a sectional view of a chuck of the threaded arbor hole variety generally used with portable drills; Fig. 2 is an enlarged sectional view of a part of Fig. 1; Fig. 3 is a sectional view of a chuck of the variety used in connection with a tapered arbor generally used with stationary drill presses, and Fig. 4 is a sectional view illustrating another embodiment of the invention.

The present application is a continuation-in-part of my copending application Serial No. 336,699 filed May 23, 1940.

The chuck illustrated is of the well known Almond type comprising the body 1, the inclined jaw recesses 2, jaws 3, toothed, threaded ring 4 and sleeve 5. In the case of Fig. 1 the arbor hole extends through the body 1 and is provided with right-handed threads 6. Seated in the lower part of the threaded portion 6 is a plug 7 provided with slot 8 at the top and a V-shaped slot 9 in its undersurface. The V-shaped portion 9 is preferably an angle of 40 to 60°. A tool 10 having a correspondingly angled shank at 11 is engaged by the V-shaped slot 9 of the plug 7. When the chuck is assembled the plug 7 is screwed into place by the use of a screwdriver or the like engaging the slot 8 and positioning the plug 7 below the position of the bottom end of the arbor 12. When the chuck has been screwed upon the arbor to a tight fit against the shoulder or flange 16 the plug 7 can be screwed up from below by a tool which engages the V-slot 9 until the upper surface of the plug 7 comes to rest against the lower end of the arbor 12 and upon further tightening effects a locked condition. This position is illustrated in Fig. 2. The drill or other tool is inserted so that its V-shaped end 11 contacts with a V-shaped slot 9 of the plug 7 whereupon the jaws 3 of the chuck are moved against the sides of the tool shank properly centering the tool. The tool, however, is not driven through the jaws but through the V-shaped connection 9 between the plug 7 and the tool shank 11. As the chuck is rotated and made to do work the tool tends to resist the force of the rotary movement directly transmitted to it and this resistance exerts a force on the plug 7 in the direction of forcing its top surface into constantly tight contact against the lower surface of the arbor 12. As indicated by the arrows in Fig. 2, the full line arrow indicates the direction of rotation of the tool as effected by the positive driving force. The dotted arrow indicates the resistance and the force which is effective on the plug 7 to impart to it a bias toward upward movement. The result is to draw the lower faces 6' of the threads 6 of the chuck tightly against the upper faces of the threads on the arbor and to draw the upper surface 6'' of the threads in the chuck body into tight engagement with the lower surfaces of the threads on the plug 7. Thus the plug 7 will act as a lock nut to maintain the chuck body on the arbor in locked condition through the very instrumentality by which the rotative force of the arbor is directly made effective upon the tool. At the same time by virtue of the V-shaped relation between the plug 7 and the tool shank it will be apparent that tools of varying diameters can be interchangeably operated. The V-shaped slot 9 should not be dimensioned much below 40° or much above 60° because in the former case the requisite gripping power particularly with the larger diametered tools is not achieved whereas in the latter case the smaller diametered tools are likely to be too weak in their tapered portion to resist the strain of the direct drive. For convenience rather than for any special mechanical or scientific reason, 60° is probably the simplest because 60° is and has been for years the standard of centers in lathes and corresponding center holes for work pieces done in lathes and grinders and every mechanic has a "center gauge" which he would have readily at hand to grind or fit the taper of the shank of the drill.

In fitting any tool such as a chuck or other fixture to a threaded arbor, especially where it is desired to be taken off and put on at comparatively frequent intervals, it is most convenient and easier to have the threads relatively free-fitting and in order to be tight on the spindle and drive properly the body of the tool should be screwed up against some kind of stop or shoulder such as 16, producing a friction at that point in order to prevent the chuck or fixture turning or becoming loose. In order to be sure that this shoulder does not disturb the position of the tool the shoulder is usually made large and the corresponding surface to match it is produced or left on the fixture or chuck. Both of these surfaces are always carefully tooled up with relation to the threads so that when the two surfaces come together, being sure that there is no dirt or foreign substance between them, the tool is brought up to a constant and true position with relation to the spindle. It would, however, be possible to omit the shoulder 16 and then depending entirely upon the threaded plug 7 being screwed in tightly and thereby drawing the chuck body up true on the drill spindle threads. However, it seems to be better to follow the usual practice of using the shoulder 16 and then screwing the body tight against that shoulder and then using the plug 7 as a check nut or as an additional locking device. Under that condition there will be two frictional surfaces to be disengaged before the chuck can come loose, whereas without the flange and with only the check nut there is only one such frictional surface which does not average to true up as well as when the flange 16 is used.

In the modified form illustrated in Fig. 3, which illustrates the invention as applied in the case of tapered spindles or arbors of stationary drill presses, the body 1 of the chuck is provided with a centrally apertured annular inwardly projecting portion 13. The arbor hole is not threaded as in the case of Fig. 1 but is tapered at 14, the connection between the chuck and the arbor in this case being of the tapered variety. The end of the arbor or of the drill press spindle is tapped to receive the right-handed screw thread 15 of the plug 7'. This plug 7' has the same V-shaped notch as described in connection with Fig. 1 but the plug is associated with a threaded portion 15. In this case the resistance of the positively driven tool tends to bias the plug 7' toward an upward movement with the result that the upper surface of the plug 7' is maintained in tight engagement against the undersurface of the projecting portion 13 of the chuck body, exerting an upward force on the chuck to maintain it in locked condition with respect to the tapered face of the arbor 12.

In both types of chuck, that is those illustrated in Figs. 1 and 3, a surface associated with the chuck or arbor and which is fixed with relation to the chuck on the arbor lies in the path of an upper or abutment surface of the plug. In Figs. 1 and 2 the fixed surface referred to is the under face of the arbor itself in the position in which the chuck and the arbor are in normally tight relation to each other. In Fig. 3 the fixed surface is the under face of the projecting portion 13 of the chuck body. In the case of both figures the abutment surface of the plug is the upper surface thereof.

A principal use of such chucks is in the portable electric tool industry, practically all of which have the threaded arbor and threaded arbor hole in the chuck as illustrated in Fig. 1. If, in such a case, the threaded plug with its V-slot to receive the end of the drill is screwed into the chuck and is not too tight a fit for the threads, the plug will, under the pressure and the torque from the drilling, screw itself back until it brings up against the threaded arbor in the electric tool and will act as a check nut to prevent the drill chuck from unscrewing from the electric tool arbor. It tightens tight enough so that the chuck may be used for tapping; in other words, it can be reversed and the tap backed out whereas under other conditions without the check nut the drill might tend to unscrew and loosen on the electric tool arbor. The use of a check nut is particularly desirable because due to the vibration caused by unbalanced conditions which is quite pronounced at the high speeds at which the small electric motor runs in the drill, checks have in some cases backed off completely and in other cases such vibration loosens the chucks on the arbor requiring either that a tighter fit of the threads should be made or that the chuck is required to be screwed on more firmly against the shoulder on the arbor at the back. In this connection it should be recalled that the modern stationary drill press operates at a high speed of the order of 22,000 R. P. M. The spindles are ballbearing-mounted and the vibration although in itself slight is of considerable consequence.

Attention is called to the circumstance that the plug of the new chuck through its capacity of independent rotary motion with relation to the arbor becomes the means of producing a locked condition between the chuck and the arbor and at the same time is the means for imparting direct drive to the tool. If the V-shaped slot were provided not on the undersurface of the plug but directly on the undersurface of the arbor the result would not be satisfactory or practical. In the first place, such an arrangement would destroy the center in the arbor and of course the presence of the V-slot would entirely remove the center hole. Furthermore the V-slot in order to be satisfactory should be case-hardened or made from material that will harden as is the case with the plug 7 of this invention. But if the V were on the end of the arbor such heat-treating would cause distortioning of the whole arbor and it could not be trued up by grinding since there no longer is a center hole in that end of the arbor. It is also important in the new construction that the bias of the plug under the urge of the resistance of the tool should be in an upward direction toward the bottom end of the arbor as it is in this way only that the locking effect as between the arbor and chuck is obtained.

The embodiment illustrated in Fig. 4 of the drawing is substantially similar to the construction illustrated in Fig. 3 in that the body 1 of the chuck is provided with a tapered arbor hole 14, a centrally apertured annular inwardly projecting portion 13 and a plug 7" having a right-handed screw thread 15 which is threadedly connected to the arbor and adapted to come into tight engagement against the undersurface of the projecting portion 13 in the manner explained with regard to the construction illustrated in Fig. 3. The plug 7'' differs from the plug 7' of Fig. 2, in that, instead of having a V-shaped notch as has the latter plug, it is cut to provide a recess having a vertical surface 16 which extends through the axial center of the plug 7'' and has a width equal to the diameter of such plug. The tool 10' is likewise provided on its upper end with a complementary surface 17 formed by milling the shank of the tool to a distance approximately one-half of its diameter so that such surface 17 passes through the axial center of the tool shank. Preferably the longitudinal dimension of the surfaces 16 and 17 is at least equal to the diameter of the plug 7''. This type of interlock between the plug 7'' and the shank 10' it has been found, possesses certain advantages over the V-shaped notch particularly in the larger sizes of drills where the driving torque is relatively high. It will of course be understood that the same type of interlock can be utilized between the plug 7 of the construction shown in Fig. 1 of the drawing and the tool shank to be connected thereto.

I claim:

1. A positive drive chuck comprising a body portion adapted to receive one end of an arbor, a permanent, frictional surface provided on the arbor-receiving end of said body portion and formed and positioned to be engaged in tight frictional relation by a surface portion on such end of the arbor to fix the chuck with relation to the arbor, a second surface associated with one of said engaging parts and fixed with relation to the chuck body, a plurality of jaws slidably arranged on said chuck body and adapted to be moved into contact with the outer surface of a shank inserted into the chuck body, a threaded plug seat located above the region of engagement of said jaws with a shank and arranged in alignment with said arbor and chuck, a threaded plug screwing into said seat into engagement with said end of the arbor, said plug having an abutment surface thereon and having a V-shaped slot in its lower surface adapted to be engaged by a correspondingly V-shaped shank to provide a positive drive for such shank, said connection, when the chuck is rotated against resistance of the shank, operating to bias the plug toward the fixed surface and toward bringing its said abutment surface against the said fixed surface, whereby said plug locks the connection between the chuck and the arbor and means for shifting said jaws into contact with the outer surface of a shank whose inverted V-shaped top engages the V-shaped slot of the plug.

2. A positive drive chuck comprising a body portion having a central vertical recessed portion provided with a female screw thread and adapted to receive the threaded end of an arbor, a surface at the lower end of the arbor, means for maintaining said surface fixed with relation to the chuck body, a plurality of jaws slidably arranged on said chuck body and adapted to be moved into contact with the outer surface of a shank inserted into the chuck body, a threaded plug adapted to engage with the arbor and engaging a correspondingly threaded plug seat located above the region of engagement of said jaws with a shank and in alignment with said arbor and chuck and having an upper abutment surface thereon and having a V-shaped slot in its lower surface adapted to be engaged by a correspondingly V-shaped shank to provide a positive drive for such shank, said connection, when the chuck is rotated against resistance of the shank, operating to bias the plug toward the fixed surface and bring its said upper abutment surface against the said fixed surface, whereby said plug locks the connection between the chuck and the arbor, and means for shifting said jaws into contact with the outer surface of a shank whose inverted V-shaped top engages the V-shaped slot of the plug.

3. A positive drive chuck comprising a body portion having a centrally arranged vertical tapered bore adapted to receive an arbor having a tapered end, a fixed under surface provided on an inwardly projecting portion of the chuck body, a threaded plug engaging a correspondingly threaded plug seat provided in the arbor in alignment with said arbor and chuck, said plug having a head whose upper surface constitutes an abutment surface adapted in the fully seated condition of the plug to contact with the fixed surface of the inwardly projecting portion of the chuck body and said plug having a V-shaped slot in its lower surface adapted to be engaged by a correspondingly V-shaped shank to provide a positive drive for such shank, said connection, when the chuck is rotated against resistance of the shank, operating to bias the plug toward the fixed surface and toward bringing its said abutment surface against the said fixed surface and through the threaded connection of such plug with the arbor tightening the tapered end of the arbor in the bore of the chuck, whereby said plug locks the connection between the chuck and the arbor, a plurality of jaws slidably arranged on said chuck body, and means for shifting said jaws into contact with the outer surface of a shank whose inverted V-shaped top engages the V-shaped slot of the plug.

4. A positive drive chuck comprising a body portion adapted to receive one end of an arbor, a permanent frictional surface provided on the arbor-receiving end of said body portion and formed and positioned to be engaged in tight frictional relation by a surface portion on such end of the arbor to fix the chuck with relation to the arbor, a second surface associated with one of said engaging parts and fixed with relation to the chuck body, a plurality of jaws slidably arranged in said chuck body and adapted to be moved into contact with the outer surface of a shank inserted into the chuck body, a threaded plug seat located above the region of engagement of said jaws with the shank and arranged in alignment with said arbor and chuck, and a threaded plug screwing into said seat into engagement with said end of the arbor, the body of said plug being constituted of a material hardened by heat treating and including an upper abutment surface facing said fixed surface and provided at its lower end with a recess having a surface disposed transversely to the lower surface of the plug, the hardened surfaces of said recess being adapted to be engaged by a correspondingly shaped upper end of a shank to provide a positive drive for such shank, said connection, when the chuck is rotated against resistance of the shank, operating to bias the plug toward the fixed surface and toward bringing its said abutment surface against the fixed surface, whereby said plug locks the connection between the chuck and the arbor, and means for shifting said jaws into contact with the outer surface of a shank whose upper end engages the recess of the plug.

5. A positive drive chuck comprising a body portion adapted to receive one end of an arbor, a permanent frictional surface provided on the arbor-receiving end of said body portion and formed and positioned to be engaged in tight frictional relation by a surface portion on the arbor to fix the chuck with relation to the arbor, a second surface associated with one of said engaging parts and fixed with relation to the chuck body, said body portion having an opening adapted to receive a tool shank in axial alignment with the arbor, a plurality of jaws carried by said body portion and movable into such opening into contact with the outer surface of a shank inserted into the chuck body, a threaded plug located in said body portion to be intermediate and in engagement with the ends of the arbor and shank inserted into such body and engaging a correspondingly threaded plug seat arranged in alignment with such arbor and chuck, said plug having an abutment surface facing said fixed surface and provided with a recess adapted to be engaged by the inserted end of the tool shank, such recess having a surface disposed transversely to the lower surface of the plug and engageable by a complementary surface on the end of the shank to provide a positive drive for such shank, said connection, when the chuck is rotated against resistance of the shank, operating to bias the plug toward said fixed surface and toward bringing its said abutment surface against such fixed surface to lock the connection between the chuck and the arbor.

6. A positive drive chuck such as is defined in claim 5, in which the transverse surface of the recess extends substantially longitudinally of the plug, such recess having a second surface of segmental shape and disposed in substantial parallelism with the lower surface of the plug.

MINOTT P. HUBBELL.